P. PHILIPPI.

Cockeyes and Button-Holes for Harness-Traces.

No. 133,117.  Patented Nov. 19, 1872.

Witnesses  
J. Philippi  
R. J. Philippi

Inventor  
P. Philippi

UNITED STATES PATENT OFFICE.

POMPEIUS PHILIPPI, OF CASS COUNTY, ILLINOIS.

IMPROVEMENT IN COCKEYES AND BUTTON-HOLES FOR HARNESS-TRACES.

Specification forming part of Letters Patent No. 133,117, dated November 19, 1872.

*To all whom it may concern:*

Be it known that I, POMPEIUS PHILIPPI, of Cass county, in the State of Illinois, have invented a new and useful Improvement in Cockeyes on Traces of Harness; and I do hereby declare that the following is a full, clear, and exact description thereof, which will enable others skilled in the art to make and use the same, reference being had to the accompanying drawing forming part of this specification.

This invention relates to a new and useful improvement in the mode to prevent the voluntary detaching of the cockeyes from the hooks of single-trees of wagons, carriages, or other vehicles propelled by horses, and is also well adapted to the traces with button-holes; and it consists in providing the cockeyes and the button-holes with an elastic material—as India rubber, metallic springs, or any other elastic material—as will be more fully hereinafter described.

Figure 1:
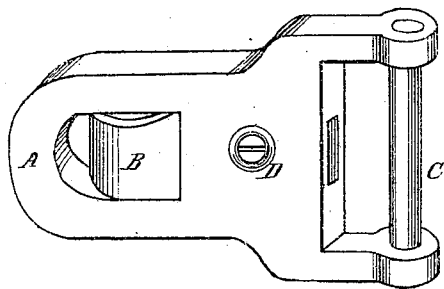
Figure 2:
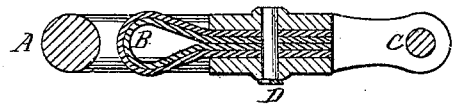

In the accompanying drawing, Figure 1 represents a perspective view. Fig. 2 represents a side view of the same.

Similar letters of reference indicate corresponding points.

A, the cockeye; B, the elastic material; C, the part the leather traces are secured to; D, a screw or rivet to secure the elastic material to the cockeye. The elastic material B, as seen in the drawing, is secured to the cockeye A with the screw or rivet D in such a manner that it partly fills the hole of the cockeye and allows the entering of the single-tree hook.

By this arrangement it will be seen that the cockeyes of traces are not loosely attached or hooked to the single-tree hooks, as commonly, but the single-tree hooks are confined in their places by the steady pressure of the elastic material, and thereby prevent the voluntary detaching of the cockeye from the single-tree hooks.

The advantages of this arrangement must be obvious to all who are familiar with the manner the traces are commonly attached or hooked with their cockeyes to the single-tree hooks, and who have experienced the annoyance of the voluntary detaching of traces from single-trees, and by which often dangerous accidents happen.

I do not claim any particular form or shape of cockeye or button-hole on traces for harness; but

What I claim, and desire to secure by Letters Patent, is—

The cockeye and button-hole for harness with an elastic, secured and operating in the manner and for the purpose substantially as specified.

P. PHILIPPI.

Witnesses:
I. PHILIPPI,
R. I. PHILIPPI.